United States Patent
Towfiq

(10) Patent No.: US 11,595,290 B2
(45) Date of Patent: Feb. 28, 2023

(54) SYSTEMS AND TECHNIQUES FOR ASSESSING A CUSTOMER PREMISES EQUIPMENT DEVICE

(71) Applicant: Promptlink Communications, Inc., Oceanside, CA (US)

(72) Inventor: Foad Towfiq, Oceanside, CA (US)

(73) Assignee: Promptlink Communications, Inc., Oceanside, CA (US)

(*) Notice: Subject to any disclaimer, the term of this patent is extended or adjusted under 35 U.S.C. 154(b) by 0 days.

(21) Appl. No.: 17/100,693

(22) Filed: Nov. 20, 2020

(65) Prior Publication Data

US 2021/0075712 A1 Mar. 11, 2021

Related U.S. Application Data

(63) Continuation of application No. PCT/US2019/033416, filed on May 21, 2019.

(60) Provisional application No. 62/674,481, filed on May 21, 2018.

(51) Int. Cl.
*H04L 43/065* (2022.01)
*H04L 43/50* (2022.01)

(52) U.S. Cl.
CPC ............ *H04L 43/50* (2013.01); *H04L 43/065* (2013.01)

(58) Field of Classification Search
None
See application file for complete search history.

(56) References Cited

U.S. PATENT DOCUMENTS

| 5,819,028 A | 10/1998 | Manghirmalani et al. |
| 2005/0278147 A1* | 12/2005 | Morton ............... G06F 11/2273 702/182 |
| 2010/0162036 A1* | 6/2010 | Linden .................. H04L 63/20 714/4.11 |
| 2010/0238814 A1 | 9/2010 | Chen et al. |

(Continued)

FOREIGN PATENT DOCUMENTS

WO 2014/032413 A1 3/2014

OTHER PUBLICATIONS

International Preliminary Report on Patentability received for PCT Patent Application No. PCT/US2019/033416, dated Dec. 3, 2020, 7 pages.

(Continued)

*Primary Examiner* — Joshua Joo
(74) *Attorney, Agent, or Firm* — Dentons US LLP

(57) ABSTRACT

The present disclosure relates generally to network diagnostics, and more specifically to techniques for determining the health of customer premises equipment (CPE) devices. In certain examples, a scoring system can determine a health score for a CPE device, the health score indicating the health of the CPE device. The health score is determined by receiving, analyzing, and integrating information from different sources, including sources in addition to CPE diagnostic data for the CPE device at the current time. Such sources can include CPE diagnostic data for the CPE device at other times, CPE diagnostic data for other CPE devices related to the CPE device (e.g., in the same household or surrounding area as the CPE device), technical specifications of the CPE device (e.g., make, model and firmware of the CPE device), or per-equalization parameters obtained by the CPE device.

15 Claims, 2 Drawing Sheets

(56) References Cited

U.S. PATENT DOCUMENTS

| | | |
|---|---|---|
| 2013/0103453 A1 | 4/2013 | Hoagland et al. |
| 2014/0280899 A1 | 9/2014 | Brewster et al. |
| 2014/0344874 A1 | 11/2014 | Olsen |
| 2014/0369208 A1* | 12/2014 | Voshi ............... H04M 3/2227 370/242 |
| 2015/0200824 A1 | 7/2015 | Sadovsky et al. |
| 2015/0269585 A1* | 9/2015 | Patnam ............... G06Q 30/014 705/303 |
| 2015/0333988 A1 | 11/2015 | Jalan et al. |
| 2015/0347252 A1 | 12/2015 | Andre et al. |
| 2016/0155098 A1* | 6/2016 | McElhinney ........... G06F 11/26 705/305 |
| 2016/0234093 A1 | 8/2016 | Chen et al. |
| 2016/0328282 A1* | 11/2016 | Rogati ............... G06F 11/0766 |
| 2017/0230211 A1 | 8/2017 | Teflian |
| 2017/0310562 A1* | 10/2017 | Jin ..................... H04L 67/1097 |
| 2018/0247256 A1* | 8/2018 | Takigawa ............... G06N 20/00 |
| 2018/0308002 A1* | 10/2018 | Kurian ................... G06F 11/00 |
| 2018/0359597 A1* | 12/2018 | Lazar .................. H04L 43/0817 |
| 2019/0044824 A1* | 2/2019 | Yadav .................... H04L 43/12 |
| 2019/0196894 A1* | 6/2019 | Cherbakov ......... H04L 43/0864 |
| 2019/0210176 A1* | 7/2019 | Yamamoto ......... G05B 19/4065 |
| 2019/0268214 A1* | 8/2019 | Maes ................... G06F 11/3051 |
| 2019/0268721 A1* | 8/2019 | Tellado ................. H04W 4/029 |
| 2019/0311552 A1* | 10/2019 | Zhang .................... G07C 5/008 |
| 2019/0361759 A1* | 11/2019 | Haugen ............... H04L 41/0631 |
| 2020/0021607 A1* | 1/2020 | Muddu ............... G06F 3/04847 |

OTHER PUBLICATIONS

International Search Report and Written Opinion received for PCT Patent Application No. PCT/US2019/033416, dated Oct. 4, 2019, 9 pages.

\* cited by examiner

SYSTEMS AND TECHNIQUES FOR ASSESSING A CUSTOMER PREMISES EQUIPMENT DEVICE

CROSS-REFERENCE TO RELATED APPLICATION

This application is a continuation of PCT Application PCT/US19/33416, entitled "TECHNIQUES FOR ASSESSING A CUSTOMER PREMISES EQUIPMENT DEVICE," filed on May 21, 2019 which claims priority to U.S. Provisional Patent Application Ser. No. 62/674,481, entitled "TECHNIQUES FOR ASSESSING A CUSTOMER PREMISES EQUIPMENT DEVICE," filed on May 21, 2018. The content of this application is incorporated by reference in its entirety for all purposes.

BACKGROUND

A service provider delivers services to users (e.g., customers) by deploying customer premises equipment ("CPE") devices at the users' premises and connecting the CPE devices to a network or infrastructure corresponding to the service provider. Examples of such services include multimedia, audio, video, telephone, data communications, wireless networking, and wired networking services. For example, a cable company can deliver media services to a user by connecting a CPE device, such as a set-top box or a cable modem, located at the user's premises, to the cable company's network. However, due to some service degradation, CPE devices are often swapped and exchanged because it is perceived that the CPE devices are defective while the cause of the service degradation is another problem in the network and not the CPE devices themselves. Therefore, there is a need in the art to better assess CPE devices.

SUMMARY

The present disclosure relates generally to network diagnostics, and more specifically to techniques for determining the health of customer premises equipment (CPE) devices.

In certain examples, a scoring system can determine a health score for a CPE device, the health score indicating the health of the CPE device. The health score is determined by receiving, analyzing, and integrating information from different sources, including sources in addition to CPE diagnostic data for the CPE device at the current time. Such sources can include CPE diagnostic data for the CPE device at other times, CPE diagnostic data for other CPE devices related to the CPE device (e.g., in the same household or surrounding area as the CPE device), technical specifications of the CPE device (e.g., make, model and firmware of the CPE device), or per-equalization parameters obtained by the CPE device.

In some examples, the scoring system is updated over time based upon (1) a health score determined for a CPE device, (2) data used to determine the health score, (3) a field technician report of an action taken for the CPE (e.g., the CPE device was swapped), and (4) reverse logistics test results (e.g., whether the health score ended up being correct). For example, when the scoring system determines that a CPE device is not defective when the CPE device is not later determined to be defective, the scoring system can be updated to better determine future health scores. For another example, when the scoring system determines that a CPE device is defective when the CPE device is not defective, the scoring system can be updated to better determine future health scores.

Techniques described above may be provided as a system, method, or a non-transitory computer readable medium. For example, a system of one or more computing systems may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

DESCRIPTION OF THE FIGURES

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
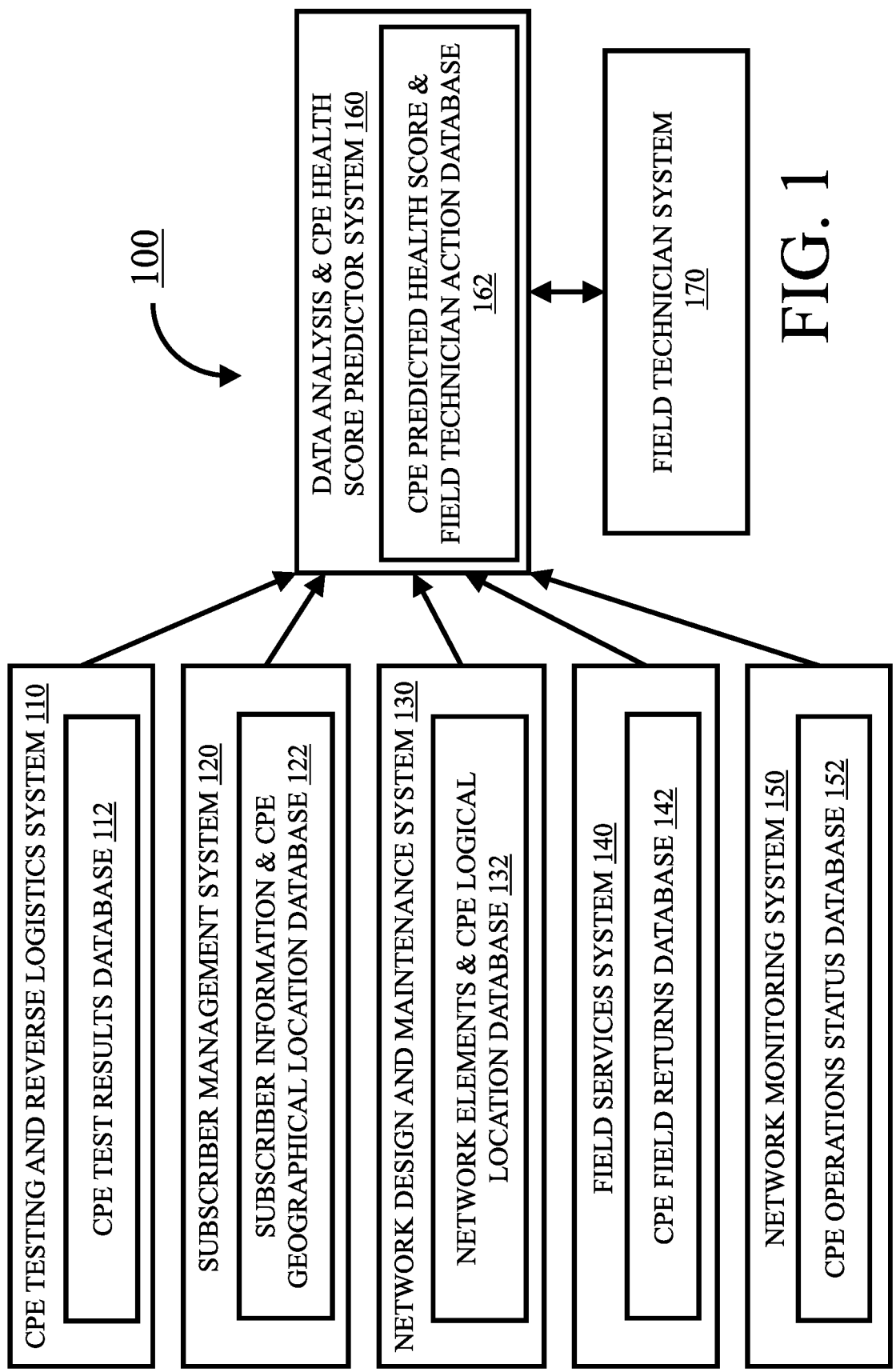
FIG. 1 depicts a distributed environment according to certain embodiments described herein.

The following description sets forth exemplary methods, parameters, and the like. It should be recognized, however, that such description is not intended as a limitation on the scope of the present disclosure but is instead provided as a description of exemplary embodiments.

The present disclosure relates generally to network diagnostics, and more specifically to techniques for determining the health of customer premises equipment (CPE) devices. For example, a service provider delivers services to users (e.g., customers) by deploying CPE devices at the users' premises and connecting the CPE devices to a network or infrastructure corresponding to the service provider.

One of the major operational expenses of the service provider is CPE field returns and reverse logistics. Generally, when a field service technician visits a user's premises to address a service degradation issue or fix a service outage, the field service technician swaps a CPE device as the first action to eliminate the possibility of the CPE device being the cause of the problem. In many cases, the swapped CPE device is functioning properly. To redeploy the CPE device, the CPE device needs to be tested, cleaned, and repackaged with generally new cables and power supplies.

The goal of some techniques described herein is to reduce the number of field returns by providing a health score for CPE devices. With the health score, field service technicians can make informed decisions whether to swap the CPE devices or not.

In certain examples, a scoring system can determine a health score for a CPE device, the health score indicating the health of the CPE device. For example, from 1 to 10, a health score of 3 indicates that the CPE device is most likely defective and needs to be swapped and a score of 8 indicates that the CPE device is most likely good and does not need to be swapped.

In some examples, the health score is determined by receiving, analyzing, and integrating information from different types of data, including data in addition to CPE diagnostic data for the CPE device at the current time. Such data in addition to CPE diagnostic data can include CPE diagnostic data for the CPE device at other times, CPE diagnostic data for other CPE devices related to the CPE device (e.g., in the same household or surrounding area as the CPE device), technical specifications of the CPE device (e.g., make, model and firmware of the CPE device), or per-equalization parameters obtained by the CPE device.

In some examples, the scoring system integrates information from a subscriber management system and a network topology system to locate a CPE device accurately in a neighborhood. Once locating the CPE device, a network monitoring system provides the health of a network in the neighborhood. For example, if there are network problem in the neighborhood, chances are that the CPE device is ok and the service degradation or the service outage is due to the network problem outside of the home. The reverse logistics historical test data along with field operation CPE tracking data can also be used to determine the health score. For example, if the CPE device had been returned from the field multiple times previously, if it has been repaired or not, can be factors to for determining the health score.

In some examples, the scoring system is updated over time based upon (1) a health score determined for a CPE device, (2) data used to determine the health score, (3) a field technician report of an action taken for the CPE (e.g., the CPE device was swapped), and (4) reverse logistics test results (e.g., whether the health score ended up being correct). For example, when the scoring system determines that a CPE device is not defective when the CPE device is not later determined to be defective, the scoring system can be updated to better determine future health scores. For another example, when the scoring system determines that a CPE device is defective when the CPE device is not defective, the scoring system can be updated to better determine future health scores.

FIG. 1 depicts distributed environment 100 according to certain embodiments described herein. Distributed environment 100 is provided for illustrative purposes. It should be recognized that techniques described herein can be implemented in a distributed environment different from distributed environment 100.

Distributed environment 100 includes multiple systems where data is stored, each system representing a functional department of an enterprise. For example, distributed environment 100 includes CPE testing and reverse logistics system 110, which performs (1) testing of CPE devices and (2) reverse logistics. In some examples, CPE testing and reverse logistics system 110 includes a CPE test platform for testing CPE devices. The CPE test platform can store testing results in CPE test results database 112. The testing results can include an identification of a CPE device (e.g., a MAC address and/or Serial Number), a description of the CPE device (e.g., make and model, hardware version, firmware version, or the like), results from one or more functional tests (e.g., wired connectivity, wireless connectivity, diagnostics parameters, or the like), performance parameters (e.g., bandwidth, packet loss, phone call performance, video quality, or the like), how many times the CPE device was returned from the field and tested on the CPE test platform, or the like.

Distributed environment 100 further includes subscriber management system 120, which performs customer management functions. In some examples, subscriber management system 120 includes a billing system for storing customer records in subscriber information & CPE geographical location database 122. The customer records can include a customer's name and physical address, serial numbers and/or MAC addresses for one or more CPE devices corresponding to the customer, an identification of a node (and/or amplifier) that is connected to the one or more CPE devices, or the like.

Distributed environment 100 further includes network design and maintenance system 130, which stores information regarding a network corresponding to a particular service provider. In some examples, network design and maintenance system 130 includes one or more system maps stored in network elements & CPE logical location database 132. The system maps can include the location of network elements (e.g., nodes, amplifiers, taps, or the like), routing of the cables and fibers, how the network elements are connected to each other and to CPE devices, or the like.

Distributed environment 100 further includes field services system 140, which stores field data regarding field services. In sonic examples, field services system 140 includes field operations CPE tracking tools for storing the field data CPE field returns database 142. The field data can include an identification of a CPE device that has been swapped (e.g., a serial number and/or MAC address), a description for a cause to swap the CPE device (e.g., a technical issue, service degradation, service disconnection request, or the like), or the like.

Distributed environment 100 further includes network monitoring system 150, which performs monitoring functions. In sonic examples, network monitoring system 150 includes a CPE status polling engine for polling CPE devices to obtain operating data for CPE devices. The operating data can include functional parameters, performance parameters, diagnostics parameters, or the like for one or more CPE devices. Examples of some parameters that can be received from a cable modem and CMTS include: upstream and downstream power levels, upstream and downstream signal to noise ratios, parameters related to Forward Error correction (which can show how hard the cable modem is working to correct the packets dropped due to noise in the network—an indication of noise), per-equalization parameters in the cable modem, post equalization parameters in CMTS, group delays, frequency response delays related to different frequencies, full band spectrum analysis in downstream from the cable modem, spectrum analysis in upstream from the CMTS, diagnostic parameters from the cable modem, micro-reflection due to impedance mismatch, bent cables, corroded connectors, or the like, CMTS flap list (e.g., how often a CPE device goes online and offline), or the like.

Distributed environment 100 further includes data analysis & CPE health score predictor system 160 for performing techniques described herein related to determining a health score for a CPE device. In some examples, data analysis & CPE health score predictor system 160 includes an artificial intelligence or machine learning engine for determining the health score. After determining the health score, the artificial intelligence or machine learning engine can store the health score in CPE predicted health score & field technician action database 162. In some examples, the health score can be stored as a tuple with an indication of a field technician action (e.g., whether the CPE device was swapped or not). The field technician action can either be received from (1) field technician system 170 (e.g., an application executing on a mobile phone being operated by a field technician) or (2) one or more of the systems discussed above (e.g., field services system 140).

Figure 2:
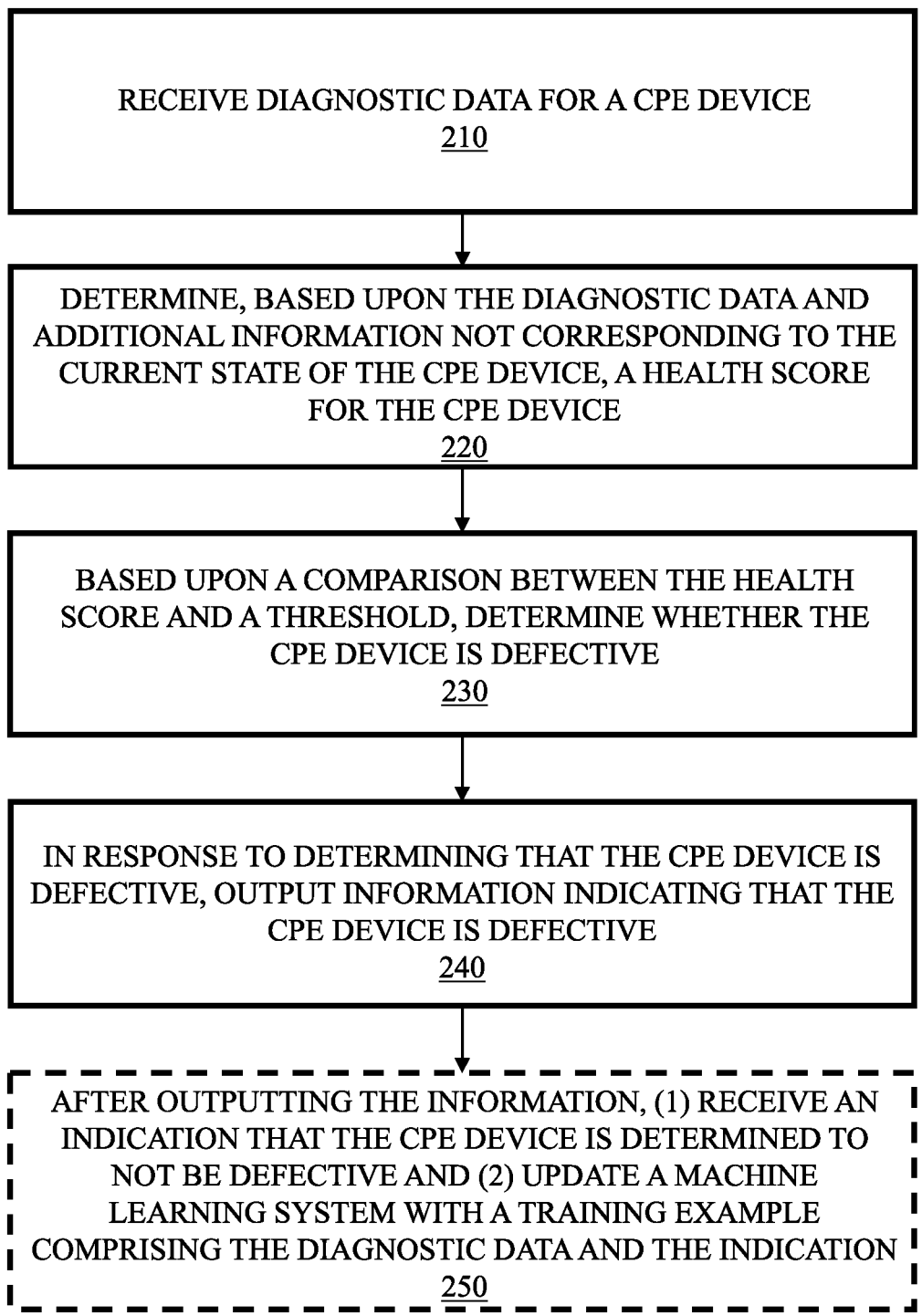
FIG. 2 depicts processing performed for determining that a customer premises equipment device is defective according to certain embodiments described herein.

FIG. 2 depicts processing performed for determining that a customer premises equipment (CPE) device is defective according to certain embodiments described herein. The processing depicted in FIG. 2 can be implemented in software (e.g., code, instructions, program, or the like) executed by one or more processing units (e.g., processor cores), in hardware, or using combinations thereof. The software can be stored on a non-transitory computer readable medium (e.g., a storage device, memory, or the like). The particular series of processing operations depicted in FIG. 2 is not intended to be limiting. In one example, the processing depicted in FIG. 2 is performed by a data analytics & CPE health score predictor system (e.g., data analytics & CPE health score predictor system 160 as depicted in FIG. 1).

The processing in FIG. 2 begins at 210 when diagnostic data is received. The diagnostic data corresponds to a current state of the CPE device. In some examples, the diagnostic data is generated by the CPE device. In some examples, the diagnostic data is received from the CPE device. In some examples, the diagnostic data includes configuration information, performance information (e.g., a value indicative of the transmit signal level of the CPE device, a value indicative of the receive signal level of the CPE device, time since the CPE device was last booted, signal power levels, signal-to-noise ratio from the CPE device, or the like), a fault indication, a log file, or any combination thereof.

At 220, a health score for the CPE device is determined. The health score is determined based upon the diagnostic data and additional information not corresponding to the current state of the CPE device. In some examples, the additional information includes diagnostic data for the CPE device at other times, diagnostic data for other CPE devices related to the CPE device (e.g., another CPE device in the same household or neighborhood as the CPE device), technical specifications of the CPE device (e.g., make, model and firmware of the CPE device), or per-equalization and/or full band spectrum parameters obtained by the CPE device, or the like. The per-equalization parameters are used in DOCSIS and some other networks. For example, when there is an impairment in a network, such as a bent cable or a corroded connector the signal is being degraded, CPE devices and a termination system at a headend, the per-equalization parameters are modified to be able to have the CPE devices function properly. In some examples, the additional information relates to the health of a network associated with the CPE device, information related whether the CPE device has been returned from the field previously, or information related to what part of the network the CPE device was previously deployed when the CPE device was pulled off the service.

Determining a good health score for the CPE device can be very difficult, because of the multitude of parameters. While it is possible for an administrator to spend a good amount of time to analyze diagnostic results, network health, and test results in order to create a heuristic, the health score, in some examples, is determined using a machine learning system that is trained using previous diagnostic data for other CPE devices.

At 230, based upon a comparison between the health score and a threshold, it can be determined whether the CPE device is defective. At 240, in response to determining that the CPE device is defective, information is output to indicate that the CPE device is defective.

At 250, in some examples, after outputting the information, (1) an indication is received indicating that the CPE device is determined to not be defective and (2) the machine learning system is updated with a training example comprising the diagnostic data and the indication. In some examples, the training examples includes (1) parameters related to the health of a network with the CPE device, (2) the health score determined for the CPE device, (3) a field technician action (e.g., whether the CPE device was swapped or not), and (4) reverse logistics test results (e.g., whether the test results match the health score). In some examples, the indication (referred to as feedback) is received from a test platform as described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
one or more processors; and
memory storing one or more programs configured to be executed by the one or more processors, the one or more programs including instructions for:
determining, based upon first information comprising current diagnostic data for a first customer premises equipment (CPE) device, a health score for a second CPE device, wherein the first and second CPE devices are both connected to a network corresponding to a particular service provider and the health score is determined using a machine learning system that bases the determination of the health score at least in part on whether the second CPE device has previously been returned from a user's premises;
based upon a comparison between the health score and a threshold, determining whether the second CPE device is defective; and
in response to determining that the second CPE device is defective, outputting second information indicating that the second CPE device is defective;
receiving an indication that the second CPE device is determined not to be defective; and
updating the machine learning system used to determine the health score with a training example including the current diagnostic data and the indication that the second CPE device is not defective.

2. The electronic device of claim 1, wherein the first information further comprises diagnostic data for one or more devices upstream of the second CPE device.

3. The electronic device of claim 1, wherein the one or more programs include further instructions for:
receiving diagnostic data for the second CPE device, the diagnostic data corresponding to a current state of the second CPE device,
wherein the indication that the second CPE device is determined not to be defective is based on the received diagnostic data.

4. The electronic device of claim 3, wherein the diagnostic data for the second CPE device is received from and generated by the second CPE device.

5. The electronic device of claim 3, wherein the diagnostic data for the second CPE device includes configuration information, performance information, a fault indication, a log file, or any combination thereof.

6. The electronic device of claim 1, wherein the machine learning system is trained using diagnostic data generated by the first CPE device and one or more other CPE devices.

7. The electronic device of claim 1, wherein the first information includes diagnostic data for the first CPE device at other times, technical specifications of the second CPE device, per-equalization parameters obtained by the second CPE device and the health of the network corresponding to the particular service provider.

8. A non-transitory computer-readable storage medium storing one or more programs configured to be executed by one or more processors of an electronic device, the one or more programs including instructions for:
  determining, based upon first information comprising current diagnostic data for a first customer premises equipment (CPE) device, a health score for a second CPE device, wherein the first and second CPE devices are both connected to a network corresponding to a particular service provider and the health score is determined using a machine learning system that bases the determination of the health score at least in part on whether the second CPE device has previously been returned from a user's premises;
  based upon a comparison between the health score and a threshold, determining whether the second CPE device is defective; and
  in response to determining that the second CPE device is defective, outputting second information indicating that the second CPE device is defective;
  receiving an indication that the second CPE device is not defective; and
  updating the machine learning system used to determine the health score with a training example including the current diagnostic data and the indication that the CPE device is not defective.

9. A method, comprising:
  determining, based upon first information comprising current diagnostic data for a first customer premises equipment (CPE) device, a health score for a second CPE device, wherein the first and second CPE devices are both connected to a network corresponding to a particular service provider and the health score is determined using a machine learning system that bases the determination of the health score at least in part on whether the second CPE device has previously been returned from a user's premises;
  based upon a comparison between the health score and a threshold, determining whether the second CPE device is defective; and
  in response to determining that the second CPE device is defective, outputting second information indicating that the second CPE device is defective;
  receiving an indication that the second CPE device is not defective; and
  updating the machine learning system used to determine the health score with a training example including the current diagnostic data and the indication that the CPE device is not defective.

10. The method of claim 9, wherein the first information further comprises diagnostic data for one or more devices upstream of the second CPE device.

11. The method of claim 9, further comprising:
  receiving diagnostic data for the second CPE device, the diagnostic data corresponding to a current state of the second CPE device,
  wherein the indication that the second CPE device is determined not to be defective is based on the received diagnostic data.

12. The method of claim 11, wherein the diagnostic data for the second CPE device is received from and generated by the second CPE device.

13. The method of claim 11, wherein the diagnostic data for the second CPE device includes configuration information, performance information, a fault indication, a log file, or any combination thereof.

14. The method of claim 9, wherein the machine learning system is trained using diagnostic data generated by the first CPE device and one or more other CPE devices.

15. The method of claim 9, wherein the first information includes diagnostic data for the first CPE device at other times, technical specifications of the second CPE device, per-equalization parameters obtained by the second CPE device and the health of the network corresponding to the particular service provider.

* * * * *